Patented Apr. 13, 1948

2,439,421

UNITED STATES PATENT OFFICE 2,439,421

PROCESS FOR THE PRODUCTION OF DI-ALKYLATED POLYHYDRIC PHENOLS

Edwin R. Erickson, Niagara Falls, N. Y., assignor to The Mathieson Alkali Works, Inc., New York, N. Y., a corporation of Virginia No Drawing. Application August 4, 1944, Serial No. 548,136

9 Claims. (Cl. 260—625)

This invention relates to improved methods of producing polysubstituted polyhydric phenols. The process is of particular importance for the introduction of two nuclear substituents into the hydroquinone and catechol molecules.

Various methods for the production of substituted polyhydric phenols have heretofore been proposed, including condensation of the phenols with alkyl or aralkyl halides, alcohols or olefins in the presence of various catalysts, including ferric chloride, sulfuric acid, zinc chloride, etc. These processes, for one reason or another, have proven inefficient for the production of polysubstituted, e. g., disubstituted, polyhydric phenols, particularly dihydric phenols.

The present invention provides an improved process for the polysubstitution of the polyhydric phenols, particularly the disubstitution of hydroquinones and catechols, which gives the desired products in good yields, without excessive production of undesired or undesirable by-products and which is adapted to large-scale operations.

In accordance with the present invention, an alkyl or aralkyl halide, that is, a halide in which the halogen is aliphatically bound, is reacted with the polyhydric phenol in the presence of anhydrous zinc chloride as the condensing agent and with the use of a low molecular weight alcohol, that is lower alcohols containing less than 6 carbon atoms, as a solvent. Absolute ethyl alcohol is a particularly advantageous solvent, although anhydrous methyl alcohol and anhydrous iso-propyl alcohol give good results. The butyl alcohols may also be used. Alcohol containing water, such as the common 95% ethyl alcohol of commerce, may be used; but when such alcohols are used, the water seems to be removed by the zinc chloride before the main reaction starts, so that the effective amount of anhydrous zinc chloride is reduced and an additional quantity must be supplied to compensate for this loss.

In carrying out the process, the polyhydric phenol, the alkyl or aralkyl halide which is used to introduce the substituent groups, and the zinc chloride are used in approximately stoichiometrical proportions, that is, for the introduction of two substituent groups, one mole of polyhydric phenol, about two moles of the halide and two moles of the zinc chloride are used. Usually a slight excess of the alkyl or aralkyl halide is used.

As by-products of the reaction are produced the ether and the alkyl halide corresponding to the alcohol used, that is, in the course of the reaction, some of the alcohol used as a solvent is converted to the corresponding ether, and some of the corresponding alkyl halide. Indeed, the quantities of these products produced are usually sufficiently great to warrant their recovery.

Various polyhydric phenols may be substituted by two groups through the use of the process of the invention. Of particular advantage is the application of the process to the introduction of two substituent groups into hydroquinone or catechol or the monosubstituted derivatives thereof, such as chlorohydroquinone, toluhydroquinone and phenylcatechol; but other polyhydric phenols, including resorcinol, and the polycyclic polyhydric phenols such as the naphthohydroquinones, phenylhydroquinone and the trihydric phenols may be disubstituted by the use of the process.

A relatively wide range of substituent groups may be introduced by means of the process, including radicals having straight and branched chains, primary, secondary and tertiary radicals, and substituted radicals. These are introduced by the use of the corresponding halides, the reaction involving the elimination of hydrogen halide between the polyhydric phenol and the alkyl or aralkyl halide. With the aliphatic halides, the branched chain secondary and tertiary halides, particularly the tertiary alkyl halides, such as tertiary butyl chloride, tertiary amyl chloride, and the like give particularly good results, although 2-chloro-butane, and even n-amyl chloride may be used. Substituted alkyl halides may be used, including such materials as chloromethyl ether, chloromethyl isobutyl ether, 1-chloro-2,2,2-trifluorethane, and the like.

While the invention provides a convenient means of producing the di-alkyl substituted polyhydric phenols, it is particularly suitable for the introduction of the aralkyl substituents through the use of aralkyl halides, such as benzyl chloride, chloromethylnaphthalenes, chloroethyldichlorobenzene, alpha- or beta-phenylethylchloride, p-nitrobenzyl chloride, and the like. Such compounds are of advantage because they are readily available, cheap and conveniently used in the reaction. Particularly reactive are the aralkyl halides in which the aromatic group is attached to the same carbon as the halogen atom or to an adjacent carbon atom, as in 2,2-diphenyl-1-chloropropane. Those aralkyl halides in which the side chain halogen is further removed from the aromatic group are less reactive, although they may be used.

The process may be carried out under superatmospheric pressure, or at ordinary pressure, and will ordinarily be carried out under refluxing conditions. The reaction is ordinarily exothermic, and but little heat need be added. If the alkyl halides are quite volatile, it may be necessary to use super-atmospheric pressure; with less volatile halides, the use of super-atmospheric pressure is not necessary and all that is required is the use of conditions which keep the alcohol used as a solvent present in the reaction mixture.

While it is of advantage to use alkyl and aralkyl chlorides in the process, because of their ready availability and cheapness, the corresponding bromides or iodides, such as benzyl bromide, 2,2-diphenyl-1-iodopropane, and the like, may be used. In deed, the bromides and iodides are of advantage where it is desired to introduce chlor-substituted radicals without loss of chlorine in the reaction. This is possible, because the bromine and iodine radicals are more reactive than the chlorine radical, and take part in the reaction, if present, to the substantial exclusion of chlorine radicals. Thus such radicals as the beta, beta, beta-trichloro-tertiary-butyl radical may be introduced through the use of beta, beta, beta-trichloro-tertiary-butyl bromide, as the bromine atom reacts more readily than do any of the chlorine atoms. Also, when it is desired to introduce normal aliphatic radicals, especially those of high molecular weight, or aralkyl radicals in which the aromatic radical is far removed from the halogen of the halide, it is advantageous to use the bromides or iodides because of their increased reactivity.

In carrying out the reaction, it is convenient to admix the zinc chloride with the alcohol, then to add the polyhydric phenol, and then to add the alkyl or aralkyl halide, usually rather slowly to avoid a sudden rise in temperature. After the reactants have been admixed, the mixture is advantageously refluxed for about 4 to 6 hours to complete the reaction. The reaction mixture is then taken up in a suitable solvent, such as ether or chloroform, and washed, usually with dilute acid, to remove zinc chloride. The mixture may then be washed with water and steamed to remove any unreacted materials as well as any solvent, and the product, which usually is a solid, is then separated and dried in conventional ways, allowing it solidify in pans and pulverizing.

The invention will be illustrated by the following examples, but it is not limited thereto.

*Example I.*—One part of hydroquinone is added to a solution of 2.48 parts of fused zinc chloride in 1.25 parts of absolute alcohol. Four parts of chloroethyldichlorobenzene are then added slowly to avoid a sudden rise in temperature, but rapidly enough to keep the solution at the boiling point. A small amount of external heating is required. After all of the chloroethyldichlorobenzene has been added, the mixture is refluxed for 4 to 6 hours. Hydrogen chloride and copious amounts of ethyl ether are liberated. The reaction mixture is taken up in chloroform, washed with dilute hydrochloric acid until free of zinc chloride and unreacted hydroquinone, and then with water. The chloroform and unreacted chloroethyldichlorobenzene are steamed out and the residue is poured into pans to solidify. About 3.25 parts of 2,5-bis (dichlorophenylethyl) hydroquinone, M. P. 40–55° C. are obtained.

*Example II.*—Following the procedure of Example I, but using 1.77 parts of tertiary butyl chloride in place of the chloroethyldichlorobenzene, gives a yield of about 75% of 2,5-di-tert.-butylhydroquinone, M. P. 213.4° C.

*Example III.*—Proceeding as in Example II, but using one part of catechol instead of one part of hydroquinone, gives a similar yield of 2,4-di-tert.-butylcatechol, M. P. 98–100° C.

*Example IV.*—Following the same procedure, using 2.03 parts of tert.-amyl chloride and one part of hydroquinone, a similar yield of 2,5-di-tert.-amylhydroquinone, M. P. 179.4–180.4° C., is obtained.

*Example V.*—Using 2.68 parts of beta-phenyl-ethylchloride and following the same procedure, 2,5-di-phenylethylhydroquinone, M. P. 60–64° C., is obtained in about the same yield.

*Example VI.*—Following the same procedure, and using 1.3 parts of chlorohydroquinone and 1.77 parts of tert.-butyl chloride, a good yield of 2,5-di-tert.-butyl-3-chlorohydroquinone, M. P. 157–158° C., is obtained.

*Example VII.*—2, 5-dibenzylhydroquinone, liquid at room temperature, is obtained by the same procedure, using 2.42 parts of benzyl chloride per part of hydroquinone.

*Example VIII.*—To a solution of 65.6 parts of anhydrous (not fused) zinc chloride in 96 parts of synthetic methyl alcohol was added 26.4 parts of hydroquinone followed by 66.5 parts of benzyl chloride. Little reaction occurred while the benzyl chloride was being added. Refluxing was started. After about one-half hour, volatile products, including methyl chloride and methyl ether, appeared. The reaction seemed complete after 2.5 hours. The product was isolated following the procedure of Example I.

*Example IX.*—The procedure of the previous example was followed using 132 parts of hydroquinone, 328 parts of fused zinc chloride, 480 parts of absolute alcohol, and 294 parts of benzyl chloride. A trap cooled with solid carbon dioxide and carbon tetrachloride was connected to the top of the reflux condenser. Considerable quantities of the volatile products were lost, but sufficient were recovered to fractionate. On fractionation, 83 parts of ethyl chloride, boiling at 12.5° C., and 29 parts of ethyl ether were recovered. 2,5-dibenzylhydroquinone was recovered from the reaction mixture in good yield.

*Example X.*—The same procedure was followed using 66 parts of hydroquinone, 164 parts of fused zinc chloride, 240 parts of iso-propyl alcohol and 152 parts of benzyl chloride. The reaction proceeded smoothly and after about three hours the dibenzylhydroquinone was recovered as described in Example I. The yield was about the same as with absolute alcohol as the solvent.

*Example XI.*—A mixture of 22 parts of hydroquinone, 55 parts of fused zinc chloride, 59 parts of absolute alcohol and 42.5 parts of ethylene chloro-hydrin were refluxed for one hour during which little reaction occurred. About half of the alcohol was distilled off and refluxing was continued for another hour. The reaction product was then dissolved in ether, washed with dilute acid and water and dried over anhydrous calcium chloride. On evaporating the ether, a semi-solid product was obtained which was soluble in ethanol, carbon tetrachloride and water but only very slightly soluble in benzene.

I claim:

1. In a process for the production of disubstituted polyhydric phenols the improvement which comprises maintaining at a reacting temperature and in contact with one another for a substantial period of time about two molar proportions of a halogen compound in which the halogen is aliphatically bound with about one molar proportion of a polyhydric phenol and about two molar proportions of anhydrous zinc chloride in an alcohol containing from 1 to 3 carbon atoms.

2. In a process for producing nuclear dialkylated polyhydric phenols the improvement which comprises maintaining at a reacting temperature and in contact with one another for a substantial period of time about two molar proportions of an alkyl halide with about one molar proportion of a polyhydric phenol and about two molar proportions of anhydrous zinc chloride in an alcohol containing from 1 to 3 carbon atoms.

3. In a process for producing nuclear dialkylated polyhydric phenols the improvement which comprises maintaining at a reacting temperature and in contact with one another for a substantial period of time about two molar proportions of an alkyl halide with about one molar proportion of a polyhydric phenol and about two molar proportions of anhydrous zinc chloride in an absolute alcohol containing from 1 to 3 carbon atoms.

4. In a process for producing nuclear dialkylated hydroquinones the improvement which comprises maintaining at a reacting temperature and in contact with one another for a substantial period of time about two molar proportions of an alkyl chloride with about one molar proportion of hydroquinone and about two molar proportions of anhydrous zinc chloride in an absolute alcohol containing from 1 to 3 carbon atoms.

5. In a process for producing di-tert.-alkyl hydroquinones the improvement which comprises maintaining at a reacting temperature and in contact with one another for a substantial period of time about two molar proportions of a tertiary alkyl chloride with about one molar proportion of hydroquinone and about two molar proportions of anhydrous zinc chloride in an absolute alcohol containing from 1 to 3 carbon atoms.

6. In a process for producing di-tert.-butyl-hydroquinones the improvement which comprises maintaining at a reacting temperature and in contact with one another for a substantial period of time about two molar proportions of tert.-butyl chloride with about one molar proportion of hydroquinone and about two molar proportions of anhydrous zinc chloride in an absolute alcohol containing from 1 to 3 carbon atoms.

7. In a process for producing di-aralkyl dihydric phenols the improvement which comprises maintaining at a reacting temperature and in contact with one another for a substantial period of time about two molar proportions of an aralkyl chloride with about one molar proportion of a dihydric phenol and about two molar proportions of anhydrous zinc chloride in an absolute alcohol containing from 1 to 3 carbon atoms.

8. In a process for producing dibenzylhydroquinone the improvement which comprises maintaining at a reacting temperature and in contact with one another for a substantial period of time about two molar proportions of benzyl chloride with about one molar proportion of hydroquinone and about two molar proportions of anhydrous zinc chloride in an absolute alcohol containing from 1 to 3 carbon atoms.

9. In a process for producing bis-(dichlorophenylethyl)-hydroquinone the improvement which comprises maintaining at a reacting temperature and in contact with one another for a substantial period of time about two molar proportions of chloroethyldichlorobenzene with about one molar proportion of hydroquinone and about two molar proportions of anhydrous zinc chloride in an absolute alcohol containing from 1 to 3 carbon atoms.

EDWIN R. ERICKSON.

REFERENCES CITED

The following references are of record in the file of this patent:

UNITED STATES PATENTS

| Number | Name | Date |
|---|---|---|
| 1,991,332 | Perkins | Feb. 12, 1935 |
| 2,030,423 | Austin | Feb. 11, 1936 |
| 2,039,344 | Putnam | May 5, 1936 |
| 2,107,307 | Rawlins | Feb. 8, 1938 |
| 2,161,826 | Kyrides | June 13, 1939 |
| 2,178,571 | Flett | Nov. 7, 1939 |
| 2,189,805 | Kyrides | Feb. 13, 1940 |

OTHER REFERENCES

MacArdle, "Solvents in Synthetic Organic Chemistry," 1925, page 40 et seq.

Certificate of Correction

Patent No. 2,439,421.

April 13, 1948.

EDWIN R. ERICKSON

It is hereby certified that errors appear in the printed specification of the above numbered patent requiring correction as follows: Column 2, line 1, for the words "of the" read *to the*; column 3, line 49, before "solidify" insert *to*; and that the said Letters Patent should be read with these corrections therein that the same may conform to the record of the case in the Patent Office.

Signed and sealed this 1st day of June, A. D. 1948.

[SEAL]

THOMAS F. MURPHY,
*Assistant Commissioner of Patents.*